Oct. 5, 1971      H. WEINSTEIN      3,609,877

EDUCATIONAL APPARATUS

Filed April 6, 1970      2 Sheets-Sheet 1

FIG. I

INVENTOR
HAROLD WEINSTEIN

BY Brufsky, Staas, Breiner & Halsey

ATTORNEYS

Oct. 5, 1971   H. WEINSTEIN   3,609,877
EDUCATIONAL APPARATUS

Filed April 6, 1970                                              2 Sheets-Sheet 2

INVENTOR
HAROLD WEINSTEIN

BY  Brufsky, Staas,
    Breiner & Halsey
                ATTORNEYS

United States Patent Office 3,609,877
Patented Oct. 5, 1971

3,609,877
EDUCATIONAL APPARATUS
Harold Weinstein, 1820 Avenue V,
Brooklyn, N.Y. 11229
Filed Apr. 6, 1970, Ser. No. 26,018
Int. Cl. G09b 1/10
U.S. Cl. 35—9 R          5 Claims

ABSTRACT OF THE DISCLOSURE

Educational apparatus including a planar surface having groups of holes arranged in distinctive patterns. Adjacent each group of holes is indicia representing the incomplete name of a familiar object. A plurality of blocks each carry an indicium for completing one set of indicia to form the name of a familiar object pictorially represented on the block. Pegs extend from the bottom surface of each block and match the pattern of one group of holes on the planar surface so that if a correct association has been made between the indicium on one block and a set of indicia, the pegs on the block will fit into the holes indicating that a correct selection has been made.

BACKGROUND OF THE INVENTION

Field of the invention

This invention relates to an educational game or apparatus primarily intended as an aid for teaching children how to spell and to associate words with familiar objects, although it is not limited thereto.

Description of the prior art

It has heretofore been proposed to teach children how to spell and to associate words with familiar objects by the use of educational games. One type of such a game is illustrated in U.S. Patent Nos. 2,839,843, 2,505,230, and 2,656,617.

Coded blocks in the form of letters and numerals are provided. The code is applied to a different letter or numeral as a distinctive array of pegs extending from one surface thereof.

A card containing a pictorial representation of a familiar object is provided for use with the coded letters and numerals. Each card contains groups of holes, each group of holes being in a distinctive array corresponding to an array of pegs on a particular letter or numeral block.

The object is for the child to attempt to complete a problem by, for example, spelling the word which identifies or is the familiar name of the image pictorially represented on the card by fitting the correct blocks in precise order on the card to spell the name of the familiar object which has been pictorially represented. If the child correctly spells the name of the object, each block will fit in the card. If any particular letter which has been selected is incorrect, the code pegs extending from the surface of the letter block will not match the array of holes provided on the card as the child attempts to push the block into the card, thereby indicating that an incorrect letter has been selected.

The present invention extends the concept by permitting the child to solve and complete the word or letter problem by retaining a more complete visual image between a pictorial representation and the familiar name of the object pictorially represented. The use of a coded peg system enabling the student to self-correct errors is however retained in the present invention.

SUMMARY OF THE INVENTION

In carrying out the objects of the present invention a substantially planar surface having a plurality of sets of indicia representing incomplete educational problems, is provided. The most common type of surface contemplated is one in which each set of indicia represents an incomplete word or noun, which when completed is the name of a familiar object.

Associated with each set of indicia is a group of three holes. Each group of holes associated with each set of indicia is arranged in a distinctive pattern or array and represents a different letter for example, which when placed in alignment with the set of indicia will complete the name of a familiar object.

Provided as an adjunct to the planar surface are a plurality of blocks, each of which is provided with a distinctive pattern or array of three pegs extending from one surface thereof. The particular positioning of the pegs on any one block corresponds to but one group of three holes on the planar surface, so that a letter or other indicium can be provided on that block which will complete the word of a familiar object when the block is positioned with its pegs matching the preselected group of holes. To aid the student, a surface of the block is not only provided with a letter in such a position that when aligned with a selected set of indicia, it will form a word, but an object normally associated with that word is pictorially represented on the surface of the block as well.

The particular letter which will complete the name of the object pictorially represented on any one block is imprinted on an indicium-carrying extension extending upwardly from the left-hand corner of the block so that it may be placed in alignment with the selected set of indicia on the planar surface, to complete the word or name of the object pictorially represented on the block.

BRIEF DESCRIPTION OF THE DRAWINGS

Further objects and advantages of the invention will become apparent from the following specification and claims and from the accompanying drawings wherein:

DETAILED DESCRIPTION OF THE INVENTION

Figure 1:
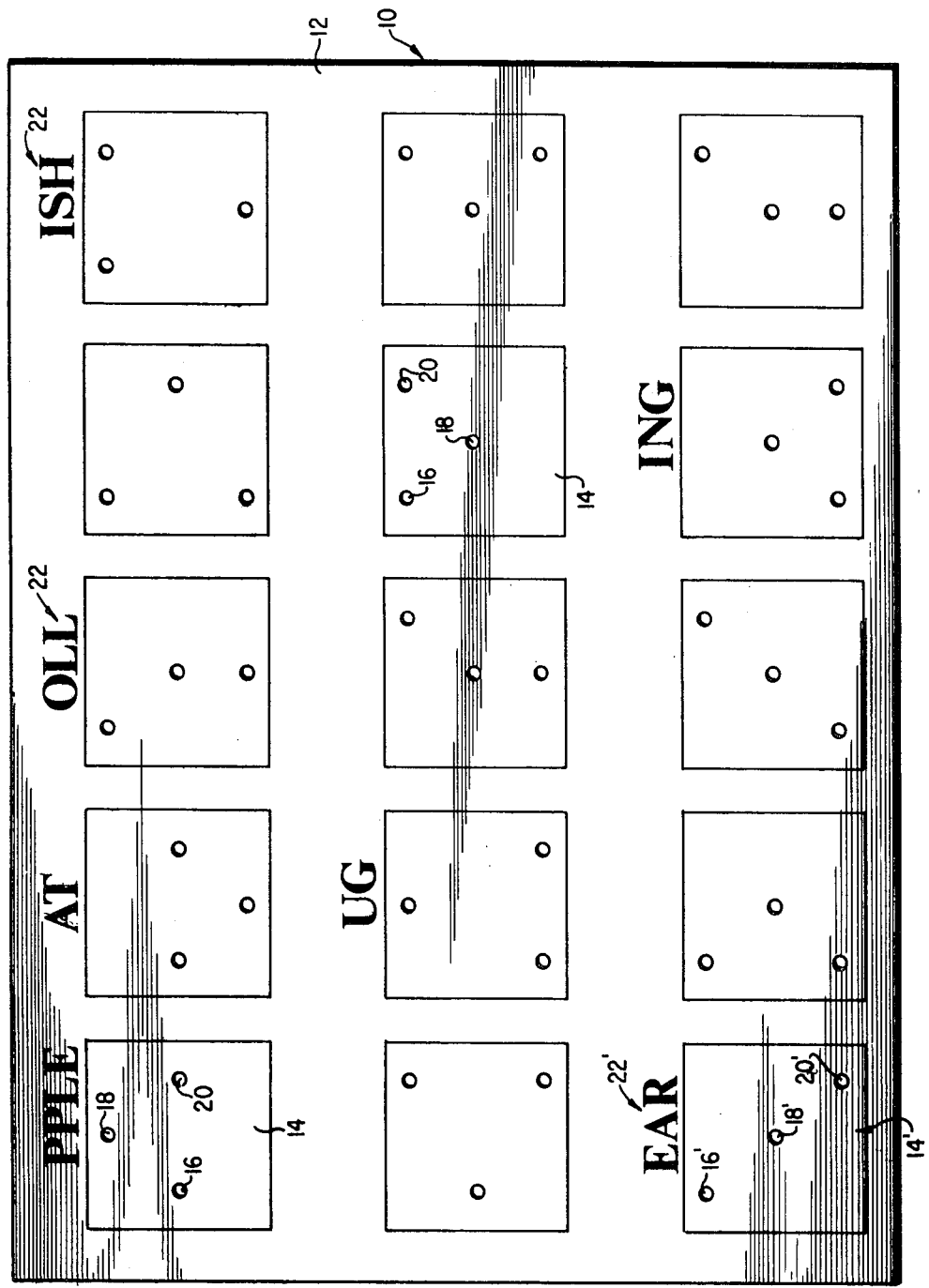
FIG. 1 is a top plan view of a board having fifteen incomplete words represented by fifteen distinct sets of indicia associated with fifteen different groups of holes, each of which constitutes a code for receiving a particular block having an indicium which will complete the word.

Referring now to the drawings in detail wherein like numerals indicate like elements throughout the several views, FIG. 1 illustrates a board 10 provided with a planar surface 12.

Inscribed on surface 12 are a plurality of squares 14 containing within their boundaries a group of three holes 16, 18, and 20. Each group of holes 16, 18, and 20 is arranged in a different pattern or array within its respective square 14.

Written above each square 14 is a set of indicia 22 representing an incomplete word or name of a familiar object. In each case, the first letter in the complete word has been deleted from each set of indicia 22.

The object of the educational apparatus is to teach a child the correct spelling, for example, of a word representing a familiar object and have the child associate the written word with that object. In order to accomplish this objective, a plurality of blocks 24 are provided.

Each block 24 has a top planar surface 26 containing the pictorial representation 28 of a familiar object. Each block 24 is substantially square except for the addition of an indicium-carrying extension 30, which extends upwardly from the upper left-hand corner of the block 24. Extension 30 includes an indicium 32 inscribed thereon which when placed in alignment with one of the sets of indicia 22 on planar surface 12 will form a complete word which is the name of the object pictorially represented at 28 on the top surface 26 of block 24.

To assure that the correct association between the indicium 32 on block 24 and a set of indicia 22 on planar surface 12 has been made, three pegs 34, 36, and 38 extend outwardly from the bottom surface 40 of block 24. The pegs 34, 36, and 38 are arranged in a distinctive array or pattern on bottom surface 40 of block 24 corresponding to one distinctive array or pattern of holes 16, 18, and 20 on the planar surface of board 12. Thus, if the child has made the correct association, the particular array of pegs 34, 36, and 38 on the block 24 selected to form the complete word will correspond in position to the array of holes 16, 18, and 20 selected on board 12, and the pegs can be inserted thereinto with the indicium 32 in alignment with the correct set of indicia 22, so that the indicium 32 and the selected set of indicia 22 will form the familiar name of the object pictorially represented at 28 on block 24.

Figure 2:
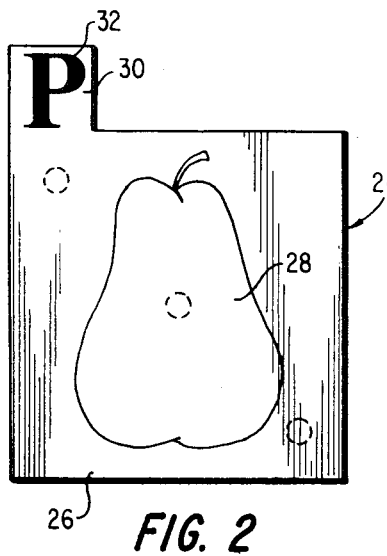
FIG. 2 is a top plan view of one of the blocks intended for use with the board illustrated in FIG. 1.
Figure 3:
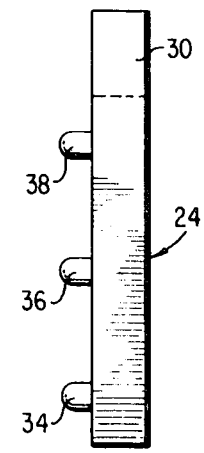
FIG. 3 is a side view in elevation of the block shown in FIG. 2 as seen from the left-hand side of FIG. 2.
Figure 4:
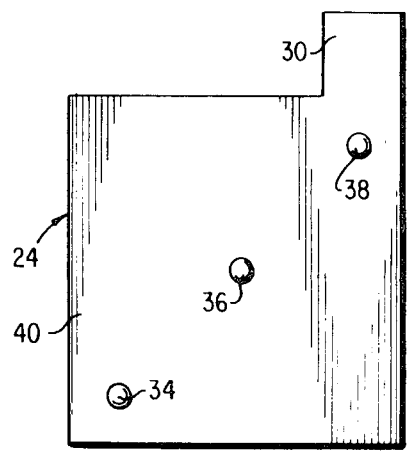
FIG. 4 is a bottom plan view of the block of FIG. 2.
Figure 5:
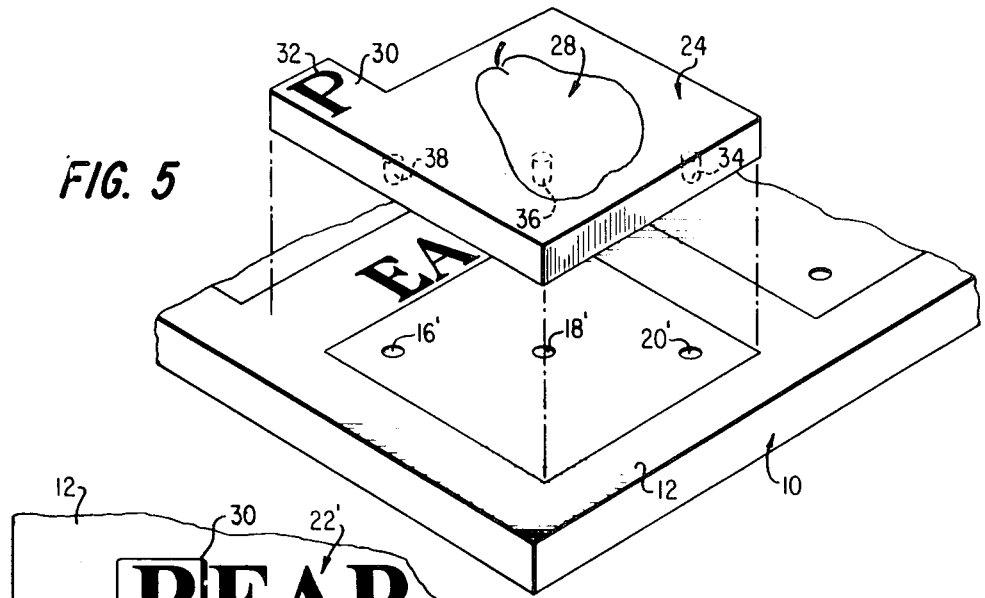
FIG. 5 is a fragmentary, perspective view illustrating the manner of associating one of the blocks and board constituting the subject of the present invention.
Figure 6:
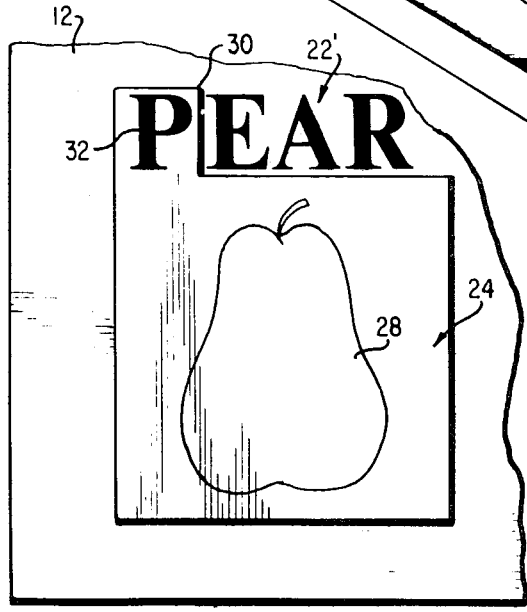
FIG. 6 is a fragmentary, top plan view of a block which has been correctly associated on the board of FIG. 1 to form the name of a familiar object pictorially represented on the block.

For example, FIGS. 2, 5, and 6 illustrate a block 24 having pictorial representation at 28 of a PEAR. The indicium-carrying extension 30 of the particular block under discussion is inscribed with the letter P. Pegs 34, 36, and 38 extending from the bottom surface 40 of block 24 are arranged along a diagonal extending from the lower right-hand corner of the block towards the upper left-hand corner.

Obviously, block 24 should be correctly positioned in the lower left-hand square 14' having associated therewith a set of indicia 22' forming a portion of the word PEAR. Holes 16', 18', and 20' within square 14' are arranged along a corresponding diagonal as pegs 34, 36, and 38 on block 24. When the student correctly selects block 24 as the correct block to position on square 14', pegs 34, 36, and 38 will enter holes 20', 18', and 16', respectively, and the indicium 32 on block 24 constituting the letter P will be aligned with indicia 22' to spell the word PEAR which correctly identifies the pictorial representation 28 on block 24. Should an incorrect block be attempted to be positioned on square 14' its array of pegs will not match holes 16', 18', and 20' enabling the student to correct the selected block by discarding the block and selecting another in its place.

While the foregoing invention is illustrated in connection with the association of words with pictures and to aid in the spelling of words representing familiar objects, it is of course understood that arithmetic problems may be posed by indicia 22 and the correct solution given by indicium 32 with a pictorial representation of a correct number of objects on top surface 26 of block 24. Further, the indicium-carrying extension 30 may extend upwardly at the center or right-hand portion of block 24 rather than the left-hand portion to complete a particular word or problem.

The invention can be used very effectively to teach a child the alphabet. For example, in lieu of the fifteen block positions depicted in FIG. 1, twenty-six sets of indicia can be provided, each set to be completed by use of a different letter of the alphabet. In this manner, a child can be taught the individual letters of the alphabet, and the letters associated with the names of familiar objects.

What is claimed is:

1. Educational apparatus comprising:
a surface having sets of indicia representing a plurality of incomplete educational problems,
distinctive code means on said surface associated with each set of indicia,
block means adapted to be associataed with selected code means on said surface by a student when completing the educational problems represented by the sets of indicia, each of said block means including
distinctive code means corresponding to one of said code means on said surface, and
an indicium-carrying extension for alignment with said selected set of indicia so that if said distinctive code means on said block means matches the code means on said surface associated with said selected set of indicia, an indicium on said indicium-carrying extension of said block means together with said set of indicia will form a complete answer to the education problem represented by said selected set of indicia.

2. Educational apparatus in accordance with claim 1 wherein each block means further includes a pictorial representation of the complete answer to the educational problem represented by said aligned selected set of indicia and said indicium on said indicium-carrying extension.

3. Educational apparatus in accordance with claim 2 wherein each of said block means is substantially rectangular in plan,
said pictorial representation being on the top surface of said rectangular block means, and
said indicium-carrying extension includes
a finger extending upwardly from the upper left-hand corner of said substantially rectangular block means.

4. Educational apparatus in accordance with claim 3 wherein said code means on said surface includes
a plurality of groups of holes, each group of holes being arranged in a distinctive array, and
said distinctive code means on each of said block means includes
an array of pegs adapted to be received in one of said groups of holes in said surface.

5. Educational apparatus in accordance with claim 4 wherein each of said groups of holes in said surface includes three holes arranged in a distinctive array, and the pegs on said block means extending from the bottom surface thereof and including three pegs.

References Cited

UNITED STATES PATENTS 2,066,871    1/1937    Wolfe _____ 35—35 J
3,380,176    4/1968    Kling et al. _____ 35—9 R WILLIAM H. GRIEB, Primary Examiner U.S. Cl. X.R.

35—35 H